Figure 1:
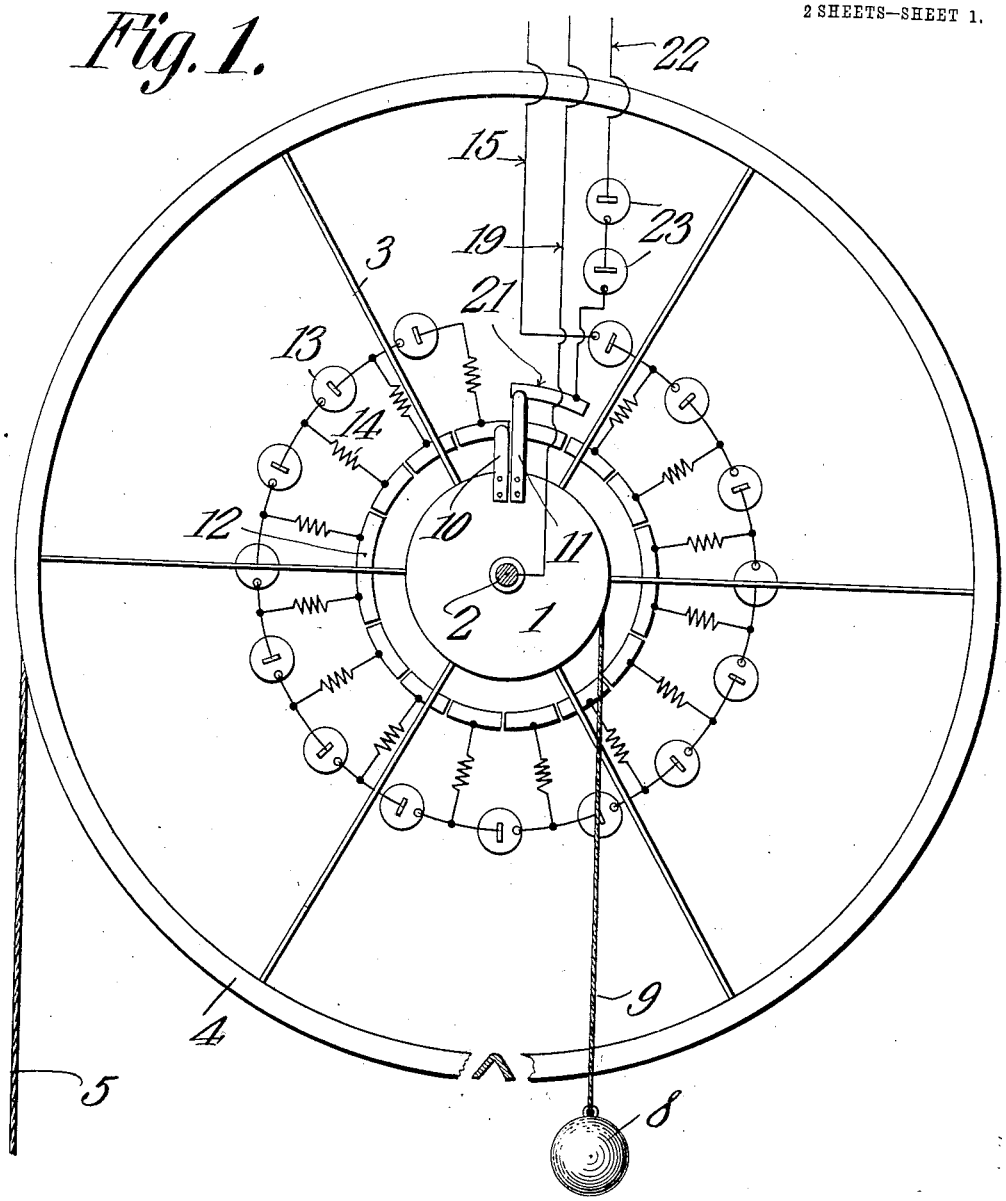

G. HARDING.
HYDROSTATIC INDICATOR.
APPLICATION FILED APR. 6, 1908.

926,251.

Patented June 29, 1909.
2 SHEETS—SHEET 1.

George Harding, Inventor.

Witnesses

By C. A. Snow & Co.,
Attorneys.

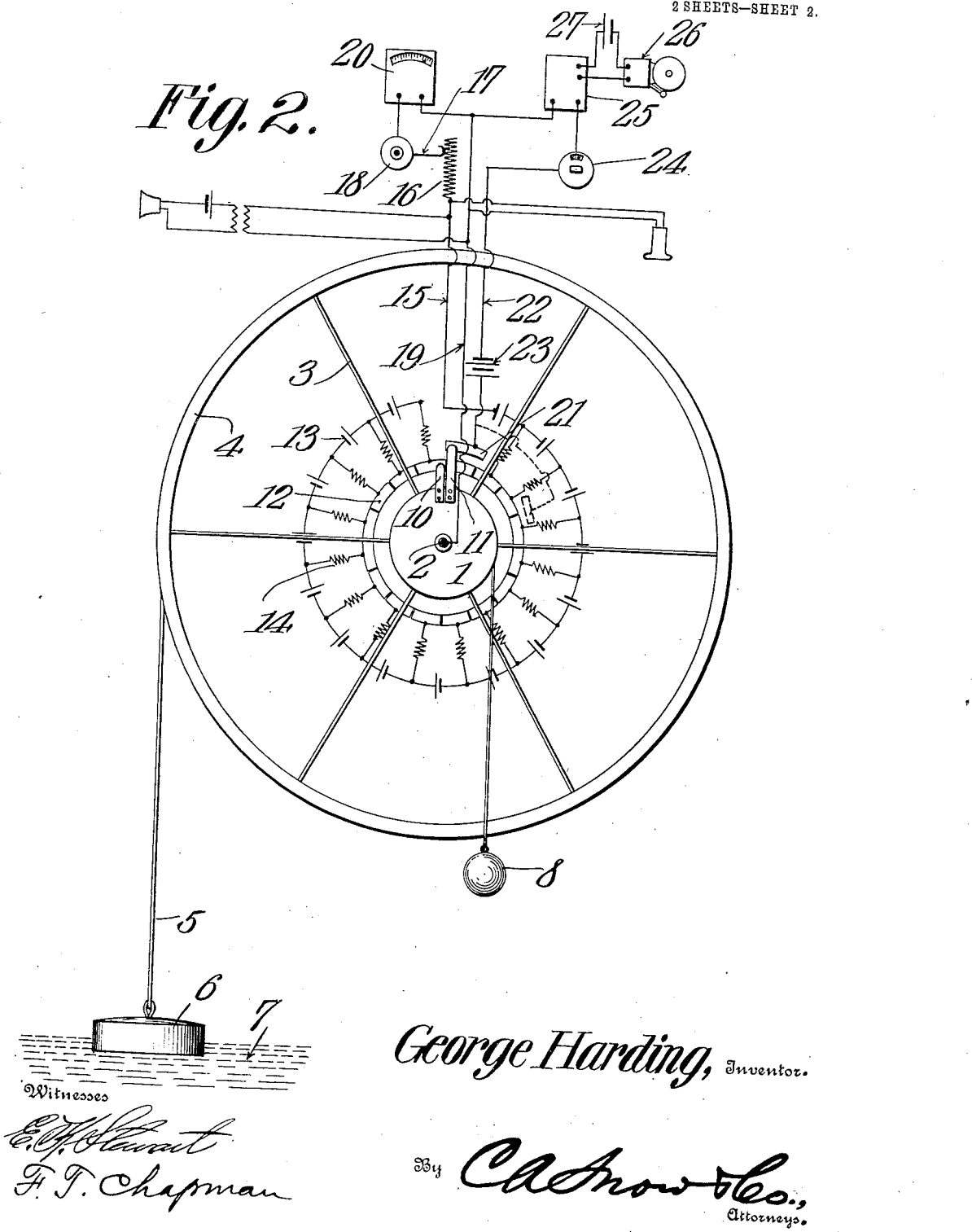

UNITED STATES PATENT OFFICE.

GEORGE HARDING, OF COEUR D'ALENE, IDAHO.

HYDROSTATIC INDICATOR.

No. 926,251.

Specification of Letters Patent.

Patented June 29, 1909.

Application filed April 6, 1908. Serial No. 425,411.

*To all whom it may concern:*

Be it known that I, GEORGE HARDING, a citizen of the United States, residing at Coeur d'Alene, in the county of Kootenai and State of Idaho, have invented a new and useful Hydrostatic Indicator, of which the following is a specification.

This invention has reference to improvements in hydrostatic indicators, and is designed to indicate the level of water or any other liquid in a tank, reservoir, or stand pipe, or of a body of water such as a lake or river, the indicator being located at any convenient distance away from the point where the level is taken.

The invention comprises a series of contact plates with a contact brush or finger movable over such plates under the influence of a float resting on the surface of the water, the level of which is to be indicated. In connection with the series of plates is a source of current preferably a series of battery cells, each of which is connected on one side to a contact plate through a suitable resistance and on the other side to the opposite pole of the next cell, except that the last battery cell of the series is connected through a variable resistance and a normally open circuit closer to an indicator responsive to electric current variation or to variations of potential. The contact brush or finger under the control of the float is connected electrically to the indicator and also mechanically to the float.

Another contact is provided and another contact finger or brush is also provided, and the additional contact plate is coupled up through a source of current and a suitable switch to a relay arranged to close a local circuit, including an alarm, when the additional contact finger closes the circuit through the additional contact plate. This additional plate and the alarm controlled thereby may be arranged as a high or low level alarm indicator.

According to one form of the invention the float is fast to a rope or cable, which in turn is wound around a wheel or drum, and a counterweight is provided to always maintain the rope sustaining the float in a taut condition. With such an arrangement the contact plates may be arranged in a circular series and the battery cells may be connected up to these plates through suitable resistances while the cells themselves are connected up in series.

At any point near or remote with relation to the float-controlled mechanism, there is provided an indicating device responsive to a current characteristic and this indicating device is further under the control of a normally open circuit closer such, for instance, as a push button so that the current for operating the indicating device only flows at the will of an observer. Furthermore, in order to utilize the same current source for actuating the current indicating device at different distances therefrom, a variable resistance may be included in the circuit, which resistance is useful in adjusting the circuit to maintain the same electrical conditions irrespective of the distance between the source of current and the indicator. Furthermore, the invention comprises an alarm system so arranged that it may be operated by an initial current of small volume and low potential through a relay so that the source of current actuating the alarm need not be subjected to the resistance of a long line. Furthermore it is possible to use a telephone by simply including the same in the line wires without the necessity of providing a separate circuit since the current flowing over the line wires is not of such character as to in itself affect a telephone. The invention, however, is not confined to the exact arrangement of parts shown, but different arrangements may be employed so long as the salient points of the invention are retained.

The invention will be best understood from a consideration of the following detail description taken in connection with the accompanying drawings forming a part of this specification, in which drawings,—

Figure 1 is a view of one form of circuit-closing means, and Fig. 2 is a partially diagrammatic representation showing the application of the invention.

Referring to the drawings, there is shown a wheel composed of a hub 1 mounted upon a shaft 2, and from this hub radiate light spokes 3 to a rim 4, which latter may have a peripheral groove for the reception of a light flexible cable 5 preferably of steel from the free end of which is suspended a float 6 designed to be sustained upon the surface of a body of water indicated at 7. The float is counterbalanced by a weight 8 suspended by a rope or cable 9 passing around the hub 1 in opposition to the float. By this means the float on falling with a lowering of the water level will raise the counterweight 8, and when the water level rises the counterweight will rotate the wheel sustaining the float. Thus, whether the water level rises or falls the wheel is rotated in the appropriate direction. Attached to the hub 1 are two fingers or brushes 10, 11. In the path of the finger 10 is a circular series of contact plates 12, as many in number and of appropriate length to indicate the maximum variations in water level in feet or fractions of feet or in accordance with any other desired measuring unit. There is also provided a series of battery cells 13, which, of course, may be replaced by any other suitable source of current, but battery cells are very convenient means for supplying current for the purpose. The cells are shown as connected up in one continuous series and each contact plate 12 is connected to an intermediate point of the coupling conductor of two cells through a suitable resistance 14. One end of the series of cells is connected directly to one of the contact segments through a resistance 14, while the other end of the series of cells is connected by a conductor 15 of suitable length to a variable resistance 16, and the movable member 17 of the variable resistance is connected to a push button 18 or other normally open circuit closer.

The hub 1 is connected by a conductor 19 to one side of an indicator 20, the other side of which is connected to the push button 18. The indicator 20 may be in the form of a galvanometer of high resistance so wound as to give indications corresponding to the number of contact plates or segments 12. If the variation in height of the float 6 be assumed to be desired in feet as the units of variation, then the segments 12 are of such length that the brush 10 will pass from one segment to the other when the variation has been greater than one foot and so continue progressively as the level rises or falls continuously. Since it is desirable that the relation between the length of the segments and the movement of the float should be constant and also that the resistance of the indicator should be constant in order that the indicator may be properly calibrated, and since for manufacturing reasons it is advisable to make the instruments all practically alike, it would follow that if there were any material differences in the line resistance the indicator would no longer truthfully respond to the movements of the float. For this reason there is included in the line circuit the variable resistance 16 so that the actual resistance of the line circuit may be maintained substantially constant, irrespective of the length of the line, within the limits of the device.

The number of segments will of course vary under certain circumstances, and may be agreeable to the maximum possible or probable variation in the water level.

Within the path of the finger 11 there is a segment or contact plate 21 out of the path of the finger 10, and the finger 11 is so arranged as to be out of the path of any of the contact plates 12, but the finger 11 is electrically connected to the conductor 19. The plate 21 may be made removable so as to be placed at any point with relation to the other contact plates and since this plate is intended to close a circuit which will produce an alarm to indicate high or low water, as the case may be, it may be placed in such relation to the float that the alarm will be given at the proper time. The contact plate 21 is connected to a conductor 22 including a battery 23 or other suitable source of electric current, and this conductor may lead to a point adjacent to the indicator 20 and at this point may include a switch 24 and finally terminate at a relay 25, the other side of which is coupled to the conductor 19. The switch 24 is preferably of the ordinary snap switch type and provided with an "on" and "off" indication. The relay 25 may be of the ordinary type and, therefore, is only indicated in the drawings by a rectangle without any attempt to show the internal construction. The relay has its local side coupled to a bell 26 and in the local relay circuit is included a battery 27 designed to supply current for the actuation of the bell when the local relay circuit is closed.

When the float is lowered or elevated to its limit of travel according to whether such limit is the low or high water level, then ultimately the finger 11 is brought into contact with the plate 21 and there is established a circuit from the battery 23 through the switch 24, which latter is normally closed, and thence through the relay 25 back to the hub 1 by the conductor 19 and to the finger 11 and plate 21. This energizes the relay and the local relay circuit is thereby closed, thus establishing the circuit fed by the battery 27, and the bell 26 will commence to ring and will continue to ring so long as the relay circuit is closed, thus indicating to the observer that either high or low water, as the case may be, has been reached.

The invention is not confined to the indication of either high or low water but may be used in other ways. The invention thus provides a means whereby an observer may ascertain from time to time at will the water level or other fluid level in a reservoir or container, or the water level of a natural body of water, such as a river or lake. The electrical side of the device is not in operation except at such times as the observer may desire and then remains in operation only so long as may be necessary to take an observation, since the push button 18 while responsive to close the circuit at the will of the operator, will automatically open the circuit as soon as pressure on the push button is relieved. The alarm circuit, however, may remain normally closed at the switch 24, and the fact that it is closed or open is indicated by the indication there displayed. It is of course advisable that the switch 24 remain closed at least until an alarm shall be given, when it may be opened after the alarm has been recognized and suitable steps taken to remedy the condition made known by the alarm. For instance, if the indicator 20 and the alarm bell 26 be located at a pumping station either near or quite remote from the reservoir, then a responsible person at the pumping station can ascertain from time to time, by pressing the push button 18, the depth of water in the reservoir, and should the water level reach its highest desirable limit then there is immediately an alarm sounded on the bell 26 when the pumping engines may be stopped. The drain on the alarm batteries 23 and 27 may be quickly stopped by opening the switch 24. Of course the same result will be had should the contact plate 21 be suitably situated, to cause the closure of the alarm circuit when the lower level is reached, thus notifying the pump station that the pumping engines should be started.

It is to be observed that whenever the finger 10 passes from one segment 12 to the next segment, there is a time during which a battery 13 is included in a local circuit including two of the resistances 14 and the two bridged contact plates 12. The movement of the float and of the finger or brush 10 is usually quite slow, and the contact plates may be bridged for a very appreciable time. To prevent the draining of a particular short circuited battery 13 is the purpose of the resistances 14.

The wheel or sheave actuated by the float or counterweight, as the case may be, together with the contact segments, may be located over the body of water, the level of which it is desired to ascertain from time to time.

Since the showing of the drawing is in a large measure diagrammatic, it is deemed unnecessary to show any supporting structures. The indicator 20 and the alarm can be located at a pumping station close to the reservoir or may be located at any other point distant many miles from the float and the parts controlled thereby, as may be expedient.

What is claimed is:—

1. A fluid level indicator comprising an electric circuit including means for charging said circuit with an electric current, means for varying such current in accordance with the variation of fluid level, an indicator responsive to said current variations also included in the circuit, another circuit, means under the control of the means for causing variations of current by variations of fluid level for closing said last named circuit at a predetermined change of fluid level, and an alarm circuit under the control of the second circuit and responsive only on the closure of the second circuit.

2. A fluid level indicator comprising a rotatable member, a float and connections therefrom to the rotatable member for moving said member in one direction, a counterweight and connections therefrom to the rotatable member for moving the latter in the other direction, a circular series of contact plates, sources of current connected together in series, connections between each current source and a respective one of the contact plates, a resistance element for preventing short circuiting included in each connection between the current sources and the respective contact plates, an indicator responsive to variations in current, an electric circuit including the indicator, means under the control of the rotatable member for coupling the current sources to said circuit, another charged circuit, an alarm under the control of the last named circuit, a contact terminal for said last named circuit, and a circuit closer carried by the rotatable member and adapted to engage the last named contact terminal to close the last named circuit.

3. A fluid level indicator comprising a rotatable member, a float and connections therefrom to the rotatable member for moving the said member in one direction, a counter-weight and connections therefrom to the rotatable member for moving the latter in the other direction, a circular series of contact plates, sources of current connected in series, connections between each source of current and the respective ones of the contact plates, a resistance element for preventing short circuiting and included in each connection between the current sources and the respective contact plates, an indicator responsive to variations in current, a normally open electric circuit including said indicator, a circuit closer under the control of the rotatable member for coupling the current sources in series with the indicator in accordance with the variations in fluid level, means included in the circuit through the electrical indicator for momentarily closing said circuit at the will of an operator, and a variable resistance also included in the electrical indicator circuit.

4. A fluid level indicator comprising a rotatable member, a float and connections therefrom to the rotatable member for moving said member in one direction, a counter-weight and connections therefrom to the rotatable member for moving the latter in the other direction, a circular series of contact plates, sources of current connected one to each contact plate, resistances included in the connections between the sources of current and the respective contact plates, an indicator responsive to variations in current, a normally open electric circuit including said indicator, means under the control of the rotatable member for including the current sources in series with the indicator in accordance with the variations in fluid level, means included in the circuit with the electrical indicator for momentarily closing the circuit thereto at the will of the operator, another circuit, a switch, relay and source of current included therein, means under the control of the rotatable member for closing the second circuit when the fluid level reaches a predetermined point, and an alarm circuit under the control of the relay.

In testimony that I claim the foregoing as my own, I have hereto affixed my signature in the presence of two witnesses.

GEORGE HARDING.

Witnesses:
 MARGARET E. MAIN,
 IRA H. SHAELIS.